United States Patent
Welton et al.

(10) Patent No.: US 8,470,747 B2
(45) Date of Patent: Jun. 25, 2013

(54) CARBOXYLIC ACID AND OXIDIZER CLEAN-UP COMPOSITIONS AND ASSOCIATED METHODS OF USE IN SUBTERRANEAN APPLICATIONS

(75) Inventors: Thomas D. Welton, Duncan, OK (US); Richard W. Pauls, Duncan, OK (US); Jeff T. Fleming, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 315 days.

(21) Appl. No.: 12/254,307

(22) Filed: Oct. 20, 2008

(65) Prior Publication Data
US 2010/0099587 A1    Apr. 22, 2010

(51) Int. Cl.
*C09K 8/52* (2006.01)

(52) U.S. Cl.
USPC ........... 507/268; 507/129; 507/239; 507/260; 507/267; 507/269; 166/305.1

(58) Field of Classification Search
USPC   507/129, 239, 260, 267, 268, 269; 166/305.1
See application file for complete search history.

(56) References Cited

U.S. PATENT DOCUMENTS

| | | | |
|---|---|---|---|
| 4,609,475 A * | 9/1986 | Hanlon et al. ................ | 507/260 |
| 5,067,565 A | 11/1991 | Holtmyer et al. | |
| 5,373,901 A | 12/1994 | Norman et al. | |
| 5,950,731 A * | 9/1999 | Shuchart et al. ............. | 166/300 |
| 6,138,760 A | 10/2000 | Lopez et al. | |
| 2002/0036088 A1 * | 3/2002 | Todd ............................ | 166/300 |
| 2004/0242430 A1 | 12/2004 | Griffin et al. | |
| 2006/0073985 A1 * | 4/2006 | Patel et al. .................... | 507/129 |
| 2006/0089265 A1 * | 4/2006 | Hanes et al. ................. | 507/203 |
| 2006/0144592 A1 | 7/2006 | Hanes, Jr. et al. | |
| 2006/0194700 A1 * | 8/2006 | Gatlin et al. .................. | 507/140 |
| 2008/0099207 A1 * | 5/2008 | Venditto et al. ............ | 166/308.3 |
| 2012/0190595 A1 | 7/2012 | Welton et al. | |

FOREIGN PATENT DOCUMENTS

| | | |
|---|---|---|
| EP | 1 223 207 A1 | 7/2002 |
| WO | WO 2006/048614 A1 | 5/2006 |

OTHER PUBLICATIONS

International Search Report and Written Opinion for PCT/GB2009/002273 dated Dec. 21, 2009.
Halliburton brochure entitled "Musol a Mutual Solvent" dated Jan. 2008.
Halliburton brochure entitled "Oxol II Oxidant/Polymer Solvent" dated Jan. 2008.
Halliburton brochure entitled "ViCon NF Breaker" dated Jan. 2008.
Halliburton brochure entitled "GasPerm 1000 Service Helps Control Fracture Face Damage and Boost Production from Unconventional Gas Reservoirs" dated Apr. 2008.
Canadian Official Action for CA 2,739,355 dated Jun. 11, 2012.

* cited by examiner

*Primary Examiner* — Alicia Toscano
(74) *Attorney, Agent, or Firm* — Robert A. Kent; McDermott Will & Emery LLP

(57) ABSTRACT

Of the many methods provided herein, one method of reducing the viscosity of a viscosified treatment fluid includes: providing a clean-up composition comprising a carboxylic acid; providing a chlorite-based breaker system; providing a viscosified treatment fluid; placing the viscosified treatment fluid in a subterranean formation via a well bore penetrating the subterranean formation; contacting the viscosified treatment fluid with the clean-up composition; contacting the viscosified treatment fluid with the chlorite-based breaker; and allowing the viscosity of the viscosified treatment fluid to reduce. Also provided herein are methods that include a method of reducing polymeric residue from a subterranean formation that includes: placing a clean-up composition and a chlorite-based breaker system in a subterranean formation in contact with an amount of polymeric residue; and allowing the amount of polymeric residue present in the formation to be reduced.

21 Claims, No Drawings

CARBOXYLIC ACID AND OXIDIZER CLEAN-UP COMPOSITIONS AND ASSOCIATED METHODS OF USE IN SUBTERRANEAN APPLICATIONS

BACKGROUND

The present invention relates to methods and compositions for treating subterranean well formations, and more specifically, to improved clean-up compositions comprising carboxylic acids and oxidizers, and methods for reducing the viscosity of viscosified treatment fluids.

A variety of viscosified treatment fluids are used in subterranean applications, such as drilling fluids, fracturing fluids, and gravel pack fluids. As used herein, the term "treatment fluid" refers generally to any fluid that may be used in a subterranean application in conjunction with a desired function and/or for a desired purpose. The term "treatment fluid" does not imply any particular action by the fluid or any component thereof. A "viscosified treatment fluid" is a treatment fluid with some degree of viscosity usually imparted by a gelling agent or a viscoelastic surfactant. Oftentimes, after the viscosified treatment fluid has performed its desired task, it may be desirable to reduce its viscosity so that the treatment fluid can be recovered from the formation and/or particulate matter may be dropped out of the treatment fluid at a desired location within the formation. Reducing the viscosity of a viscosified treatment fluid is often referred to as "breaking" the fluid.

Well stimulation treatments, such as fracturing treatments, commonly employ viscosified treatment fluids. Fracturing generally involves pumping a viscous fracturing fluid into a subterranean formation with sufficient hydraulic pressure to create one or more cracks or "fractures." The fracturing fluid generally has a viscosity that is sufficient to suspend proppant particles and to place the proppant particles in fractures, inter alia, to maintain the integrity of those fractures once the hydraulic pressure is released. Once at least one fracture is created and the proppant is substantially in place, the viscosity of the fracturing fluid usually is reduced, and the fluid is recovered from the formation.

Similarly, sand control operations, such as gravel packing, use viscosified treatment fluids, often referred to as gravel pack fluids. Gravel pack fluids usually are used to suspend gravel particles for delivery to a desired area in a well bore, e.g., near unconsolidated or weakly consolidated formation particulates. One common type of gravel packing operation involves placing a gravel pack screen in the well bore and packing the annulus between the screen and the well bore with gravel of a specific size designed to prevent the passage of formation sand. When installing the gravel pack, oftentimes the gravel is carried to the formation in the form of a slurry by mixing the gravel with a transport fluid. The gravel, inter alia, acts to prevent the particulates from occluding the screen or migrating with the produced fluids, and the screen, inter alia, acts to prevent the gravel from entering the production tubing. Once the gravel pack is substantially in place, the viscosity of the gravel pack fluid often is reduced to allow it to be recovered from the well bore.

For some viscosified treatment fluids their viscosity may be related to pH. Thus, viscosity-reducing agents that reduce the pH of the treatment fluid may be added to reduce the viscosity of the fluid. Internal breakers, such as enzymes, oxidizers, acids, or temperature-activated viscosity reducers, also are used to reduce the viscosity of viscosified treatment fluids. Unfortunately, these traditional breakers may result in an incomplete or premature viscosity reduction. Premature viscosity reduction is undesirable as it may lead to, inter alia, the particulates settling out of the fluid in an undesirable location and/or at an undesirable time. Moreover, conventional non-delayed breakers begin to reduce the viscosity of the viscosified fluid upon addition and continue to reduce the fluid's viscosity with time until the fluid is completely broken or until the breaker is expended. Since the breaking activity begins immediately, it is common practice to start with excess viscosifier to offset the point at which the viscosity falls below an acceptable level. Using excess viscosifier is not only an added expense, it also may lead to excessive friction pressure during treatment placement.

As an alternative to using traditional breakers, breaking a viscosified treatment fluid also may be accomplished using just time and/or temperature. The viscosity of most treatment fluids will reduce naturally if given enough time and at a sufficient temperature. However, such methods generally are not practical as it is highly desirable to return the well back to production as quickly as possible as opposed to waiting for the viscosity of a treatment fluid to naturally decrease over time.

As an alternative to linear polymeric gels for pills, cross-linked gels often are used. Cross linking the gelling agent polymer is thought to create a gel structure that is better able to support solids and possibly, e.g., provide fluid-loss control. Further, cross-linked pills are thought to invade the formation face to a lesser extent to be desirably effective. To crosslink these gelling agents, a suitable cross linking agent that comprises polyvalent metal ions is often used. Complexes of aluminum, titanium, boron, and zirconium are common examples.

A disadvantage associated with conventional cross-linked gelling agents is that the resultant gel residue is often difficult to remove from the subterranean formation once the treatment has been completed. For example, in fracturing treatments, the cross-linked gels used are thought to be difficult to completely clean up with conventional breakers, such as oxidizers or enzymes. Similarly, the gel residue can be difficult and time-consuming to remove from the subterranean formation. The gel residue, at some point in the completion operation, usually should be removed to restore the formation's permeability, preferably to at least its original level. If the formation permeability is not restored to its original level, production levels can be significantly reduced. This gel residue often requires long cleanup periods. Moreover, an effective cleanup usually requires fluid circulation to provide high driving force, which is thought to allow diffusion to take place to help dissolve the concentrated buildup of the gel residue. Such fluid circulation, however, may not be feasible. Additionally, in lower temperature wells (i.e., those below about 80° F.), it is often difficult to find an internal breaker for the viscosified treatment fluids that will break the gel residue effectively. The term "break" (and its derivatives) as used herein refers to a reduction in the viscosity of the viscosified treatment fluid, e.g., by the breaking or reversing of the crosslinks between polymer molecules or some reduction of the size of the gelling agent polymers. No particular mechanism is implied by the term. Another conventional method of cleaning up gel residue is to add a spot of a strong acid (e.g., 10% to 15% hydrochloric acid) with coiled tubing, which is expensive and can result in hazardous conditions.

Another problem presented by today's crosslinked gelling agent systems with respect to clean-up is that the high temperature of the formations (e.g., bottom hole temperatures of about 200° F. or greater) often require cross linking agents that are more permanent, and thus harder to break. Examples include transition metal cross linking agents. These more permanent cross linking agents can make cleanup of the resulting gel residue more difficult.

The problem of breaking gels (whether crosslinked or not) is also a problem at many of the new lower temperature wells (e.g., bottom hole temperatures of about 130° F. or lower). Catalysis of the breakers (i.e., referred to herein a breaker activators) is often employed to improve breaking of the fluid but finding a suitable formulation that meets all performance criteria is often a challenge.

SUMMARY OF THE INVENTION

The present invention relates to methods and compositions for treating subterranean well formations, and more specifically, to improved clean-up compositions comprising carboxylic acids and oxidizers, and methods for reducing the viscosity of viscosified treatment fluids.

In one embodiment, the present invention provides one method of reducing the viscosity of a viscosified treatment fluid includes: providing a clean-up composition comprising a carboxylic acid; providing a chlorite-based breaker system; providing a viscosified treatment fluid; placing the viscosified treatment fluid in a subterranean formation via a well bore penetrating the subterranean formation; contacting the viscosified treatment fluid with the clean-up composition; contacting the viscosified treatment fluid with the chlorite-based breaker; and allowing the viscosity of the viscosified treatment fluid to reduce.

In another embodiment, the present invention provides a method of reducing polymeric residue from a subterranean formation comprising: placing a clean-up composition and a chlorite-based breaker system in a subterranean formation in contact with an amount of polymeric residue; and allowing the amount of polymeric residue present in the formation to be reduced.

The features and advantages of the present invention will be readily apparent to those skilled in the art. While numerous changes may be made by those skilled in the art, such changes are within the spirit of the invention.

DESCRIPTION OF PREFERRED EMBODIMENTS

The present invention relates to methods and compositions for treating subterranean well formations, and more specifically, to improved clean-up compositions comprising carboxylic acids and oxidizers, and methods for reducing the viscosity of viscosified treatment fluids.

One of the desirable features (many of which are not discussed or alluded to herein) of the clean-up compositions of the present invention is that they enhance the efficient break of a viscosified treatment fluid in a desirable amount of time by acting, inter alia, as an enhanced activator for a suitable chlorite-based breaker composition. This may be especially true at lower temperatures, e.g., those ranging from about 80° F. to about 250° F. Additionally, in some embodiments, the clean-up compositions of the present invention may act as clean-up agents for gel residue (e.g., residue from gel pills) or viscoelastic surfactant residues (e.g., residues left by fluids viscosified with viscoelastic surfactants). In some embodiments, the clean-up compositions also may act as mud clean up agents, for example, for a filter cake that has a polymeric component. Other features and advantages of the present invention will be evident to one skilled in the art with the benefit of this disclosure.

The clean-up compositions of the present invention may be used alone or in conjunction with a chlorite-based breaker system. At least in some embodiments, the clean-up compositions of the present invention comprise a carboxylic acid component and an oxidizer component. In at least some embodiments, the clean-up compositions may be in aqueous form, for example, mixed with a brine. Optionally, the clean-up compositions of the present invention may comprise mutual solvents and/or surfactants. Other optional components include gases, chelators, sequestering agents, iron control agents, breaker activators, reducing sugars, metal breaker activators, anti-sludging agents, corrosion inhibitors, and mixtures thereof. Other additives may be suitable as well depending on the circumstances presented as long as the additive does not negatively impact the clean-up composition.

A "chlorite-based breaker system" as used herein refers to a breaker system for a viscosified treatment fluid that comprises an effective amount of at least one compound selected from the group consisting of alkali metal chlorites or hypochlorites in at least partially water soluble form and an effective amount of a breaker activator that typically comprises a metal or an amine. Any suitable amine may be used. Examples of suitable metals may comprise at least one of the following: copper II ($Cu^{2+}$) ion, cobalt, or iron (ferrous and ferric). Cobalt may be desirable in some instances due to regulations that may apply to the use of copper in some environments. Any suitable form of these may be used. One combination that may be suitable is the combination of a $Cu^{2+}$ ion and an amine. When the activator includes both $Cu^{2+}$ ion and an amine, at least in some embodiments, it is believed that a synergistic effect may take place, which causes a faster reduction in viscosity than when $Cu^{2+}$ ion alone or an amine alone are used. The source of ferrous ions may be one or more ferrous compounds such as iron (II) sulfate heptahydrate ($FeSO_4.7H_2O$), iron (II) chloride ($FeCl_2$), and iron (II) gluconate. However, it will be understood that other sources of ferrous ions may also be used. Suitable metals of the present invention may also include transition metals, semi-metals, and metalloids. Suitable transition metals may include those elements listed in Groups 3-12 of the Periodic Table of the Elements. Suitable metals include iron. Zinc may also serve as a suitable metal. Other metals, such as chromium, copper, manganese, nickel, and vanadium may be suitable metals because of favorable breaker activation characteristics, but may not possess as environmentally desirable characteristics as iron. Suitable semi-metals may include aluminum. Suitable metalloids may include boron. In certain exemplary embodiments of the present invention, the metal may comprise iron. One skilled in the art, with the benefit of this disclosure, will recognize other suitable metals to be used in the present invention.

If used, the amount of the chlorite-based breaker system employed is that amount required to reduce the viscosity of the stabilized viscosified fluid at a temperature above about 100° F. to a preselected lower viscosity or to a complete break within a desired period of time. The optimum or effective amount of breaker system employed in the present invention depends on factors such as the injection period desired, the particular gelling agent and its concentration, the particular breaker and the formation temperature as well as other factors. Typically, however, from about 0.1 to about 30 pounds of the chlorite breaker is employed per 1000 gallons of viscosified fluid. Most preferably, to achieve a desired break in from about 6 to 24 hours in the fluid, from about 1 to about 10 pounds of chlorite is employed per 1000 gallons of fluid.

The amount of breaker activator employed, comprised of $Cu^{2+}$ ion alone, an amine alone or both $Cu^{2+}$ ion and an amine, is that amount required to activate the chlorite breaker in the temperature range of from about 100° F. to about 300° F. to yield a lower viscosity within a desired period of time. The optimum or effective amount of activator depends on factors such as the injection period desired, the particular gelling agent and its concentration, the particular breaker and the formation temperature as well as other factors.

When $Cu^{2+}$ ion is used, it can be added to the viscosified fluid in various forms such as salts, e.g., copper chloride, copper sulfate and the like, aqueous solutions of such salts or an aqueous solution of a complex formed by a chelating agent such as ethylenediaminetetraacetic acid (EDTA) and $Cu^{2+}$ ion. Typically, in whatever form the $Cu^{2+}$ ion breaker activator takes, it is combined with the viscosified fluid in an amount whereby the $Cu^{2+}$ ion is present in the viscosified fluid in an amount in the range of from about 3 to about 240 parts per million (ppm). Preferably, the $Cu^{2+}$ ion is present in the fluid in an amount in the range of from about 9 to about 90 ppm so that the fluid breaks in less than about 24 hours at temperatures below about 200° F.

Alternatively, as mentioned above, an amine can be substituted for the $Cu^{2+}$ ion as the activator. A variety of amines can be used including, but not limited to, tetraethylenepentamine, butyl amine, ethylene diamine and diethylene triamine as well as ammonia and ammonium salts such as ethylene diamine hydrogen chloride salt. Of these, diethylene triamine is preferred. Typically, the amine is combined with the viscosified fluid in an amount in the range of from about 0.025 to about 40 pounds of amine per 1000 gallons of fluid. Most preferably, to achieve desired breaks in less than 24 hours at temperatures below about 200° F., from about 0.1 to about 15 pounds of amine per 1000 gallons of fluid are employed. The term "amine" as used herein is intended to also include those compounds generally referred to as amine precursors which are capable of decomposing under the conditions of use to form amines in the fluid.

When it is desired to more rapidly break viscosified fluids at a temperature below about 200° F., a combined activator comprised of an amine and $Cu^{2+}$ ion can be employed. The optimum or effective amount of the combined activator depends upon factors such as the injection period desired, the particular gelling agent used, the breaker used and formation temperatures as described above. Generally, the total combined activator is employed in about the same amount as either single activator alone, i.e., the combined activator includes $Cu^{2+}$ ion in an amount of from about 1.5 to 120 ppm and an amine in an amount of from about 0.125 to about 20 pounds per 1000 gallons of fluid.

Surprisingly, the alkali metal chlorite or hypochlorite breaker can be dissolved in water along with the activator comprised of $Cu^{2+}$ ion or amine, or both, to form a breaker composition that can be added directly to the viscosified fluid.

When it is desirable to remove gel residue, a clean-up composition of the present invention may be used alone or in combination with the chlorite-based breaker system described above. The clean-up compositions of the present invention comprise a carboxylic acid component and an oxidizer component. One should note that it may not be desirable or advisable to mix the carboxylic acid and the chlorite-based breaker system at a well site before placing the fluids downhole or while placing the fluids downhole because of handling, environmental, and safety concerns. In some embodiments, the clean-up composition and the chlorite-based breaker system may be placed in the subterranean formation at different times and optionally separated by any suitable spacer fluid. Nonetheless, the present invention encompasses methods wherein this is a chosen method.

Suitable carboxylic acids include any carboxylic acid that may be used in subterranean applications. Acetic acid, citric acid, lactic acid, glycolic acid, formic acid, propionic acid, butanoic acid, pentanoic acid, hexanoic acid, heptanoic acid, octanoic acid, nonanoic acid, decanoic acid, dodecanoic acid, palmitic acid, and stearic acid are examples of suitable carboxylic acids. Additional carboxylic acids that may be useful are sebacic acid, phthalic acid, isophthalic acid, terephthalic acid, adipic acid, pamoic acid, suberic acid, succinic acid, traumatic acid, thapsic acid, and valporic acid. Mixtures of any of these may be suitable as well. In some embodiments, the amount of carboxylic acid to include would be from about 0% to about 15% by weight based on the weight of the calcium salt solubility of the organic acid. This percentage is determined by the desired functions and properties of the fluid and properties desired. For example, it may be based upon the solubility product of a salt formed from an organic acid (i.e., solubility of calcium formate).

Suitable oxidizers include, but are not limited to, persulfates, peroxides, perborates, and oxyacids and oxyanions of halogens. Mixtures may be suitable as well. Oxyacids and oxyanions of chlorine, for example, are hypochlorous acid and hypochlorites, chlorous acid and chlorites, chloric acid and chlorates, and perchloric acid and perchlorate. Combinations of these may be suitable as well. Salt forms are preferred for safety and ease of handling. Generally, in some embodiments, less soluble oxidizers may be preferred over more soluble oxidizers because of an inherent delay these may have. This delay may allow the oxidizers to accumulate within the formation (e.g., on a filter cake present in the formation).

In certain exemplary embodiments, the oxidizing breaker may comprise chlorous acid or hypochlorous acid salts. A salt of chlorous acid is available commercially under the tradename "VICON™" from Halliburton Energy Services of Duncan, Okla. The use of salts of the acids is preferred for ease of handling and safety.

In other exemplary embodiments, the oxidizing breaker comprises a peroxide. Suitable peroxides are available commercially under the tradename "Oxol™" breaker from Halliburton Energy Services of Duncan, Okla.

The amount of an oxidizing breaker that may be used in the breaker compositions of the present invention may depend on several factors, including, but not limited to, the injection time desired, the gelling agent and its concentration, the formation temperature and other factors. In certain embodiments, the oxidizer components of the present invention may comprise acid-consuming components such as peroxides. Suitable examples include $ZnO_2$, $CaO_2$, and $MgO_2$. Generally, the oxidizer component will be present in clean-up compositions of the present invention in an amount sufficient to completely break the gelled fluid or the unbroken gelling agent residue. In certain embodiments, the oxidizer component will comprise at least about 0.1% to about 5%, and preferably in some embodiments about 0.2% to about 3%, of the clean-up compositions of the present invention.

In certain embodiments, the oxidizer components may also comprise inherent by-products of the manufacture of the oxidizer components. Such by-products may include derivatives such as oxides and hydroxides of the ion, e.g., calcium oxide, zinc oxide, magnesium oxide, zinc hydroxide, calcium hydroxide, and magnesium hydroxide. For instance, some commercial samples of calcium peroxide are only about 70% pure; the remaining 30% may comprise calcium oxide and calcium hydroxide. Similarly, zinc peroxide and magnesium peroxide are commercially available with similar purity levels. Because of the effect that the by-products may have on the process, the relative purity of the oxidizer and its associated by-products should be considered.

In certain preferred embodiments, the oxidizer components may be encapsulated, e.g., by a polymeric or degradable material, to delay the release of the component. Suitable examples include encapsulated $ZnO_2$ particulates, encapsulated $CaO_2$ particulates, encapsulated $MgO_2$ particulates, or combinations thereof. By encapsulating the oxidizer component, a user may be able to place it into a servicing fluid or directly into a subterranean formation and to have some time before the encapsulated material begins to substantially interact with the breaker and/or the gelling agent. In certain embodiments, the encapsulated oxidizer component is released from within the encapsulating membrane by diffusion. For instance, fluid may move from outside the membrane through the membrane coating and into the core of the particle, whereupon it may dissolve the oxidizer component. Encapsulating the oxidizer component may be accomplished by any known method available to one skilled in the art. One suitable method involves a fluidized bed-coating process. Another suitable method involves spray-coating the encapsulating resin onto the delayed-release oxidizer component. An exemplary encapsulation methodology is described in U.S. Pat. No. 5,373,901, assigned to Halliburton Energy Services, which is incorporated herein by reference. For instance, the coating used to encapsulate the delayed-release oxidizer component may be a resin material that will degrade over time in the subterranean formation to release the oxidizer. Suitable resins may comprise a partially hydrolyzed acrylic resin, preferably in an aqueous-based form, which is cross-linked with either an aziridine prepolymer or a carbodiimide. The term "partially hydrolyzed acrylic," as used herein, means any of the vinyl acrylic latex polymers containing from about 0% to about 60% by weight monovinyl aromatic content as styrene; from about 5% to about 25% by weight alpha, beta unsaturated carboxylic acid content; and from about 15% to about 95% by weight alkyl acrylate or methacrylate ester content. The unsaturated carboxylic acid can comprise, for example, acrylic acid or methyl acrylic acid or mixtures thereof. The alkyl acrylate or methacrylate ester can comprise, for example, ethyl butyl or 2-ethylhexylacrylate, methyl, butyl, or isobutyl methacrylate or mixtures thereof. The vinyl acrylic latex polymers are stabilized by the addition of appropriate nonionic or anionic/nonionic surfactant systems in accordance with well-known methods for preparing and stabilizing latex polymer systems. Vinyl acrylic latex polymers of the type described above are commercially available from, for example, Rohm and Haas Company, Philadelphia, Pa. or S.C. Johnson Wax, Racine, Wis. The aziridine prepolymer can comprise, for example, pentaerythritol-tris-[beta-(aziridinyl)propionate]. The carbodiimide may comprise, for example, 1,3-dicyclohexylcarbodiimide. The partially hydrolyzed acrylic encapsulating material preferably is admixed with a particulate micron-sized material such as silica prior to or simultaneously with coating the delayed-release oxidizer component. The acrylic may be admixed with the particulate silicate in an amount such that the particulate comprises from about 0% to about 60% by weight of coating solids present. Other resins may also be suitable, including, but not limited to, polymeric materials that will degrade when downhole. The terms "degrade," "degradation," or "degradable" refer to both the two relatively extreme cases of hydrolytic degradation that the degradable material may undergo, i.e., heterogeneous (or bulk erosion) and homogeneous (or surface erosion), and any stage of degradation in between these two. This degradation can be a result of, inter alia, a chemical or thermal reaction or a reaction induced by radiation. Suitable examples include polysaccharides such as dextran or cellulose; chitins; chitosans; proteins; aliphatic polyesters; poly(lactides); poly(glycolides); poly(α-caprolactones); poly(hydroxybutyrates); poly(anhydrides); aliphatic polycarbonates; ortho esters, poly(orthoesters); poly (amino acids); poly(ethylene oxides); and polyphosphazenes. Of these suitable degradable polymers, aliphatic polyesters and polyanhydrides are preferred. One should note that if the encapsulating material releases an acid upon degradation downhole, this generated acid derivative should be considered in the overall filter cake degradation process. Selection of a suitable encapsulation resin-type coating material may be affected by at least the temperature of the subterranean formation to which the fluid will be introduced.

The amount of an encapsulating coating to include can depend on the desired rate of release of the oxidizer component. One of ordinary skill in the art, with the benefit of this disclosure, will recognize the appropriate amount of encapsulating material to use based on the desired rate of release of the oxidizer component. In certain embodiments, the encapsulated oxidizer component will have an encapsulated coating in an amount from about 10% to about 50% by weight of the encapsulated oxidizer component. Preferably, the coating will comprise from about 20% to about 40% by weight of the encapsulated oxidizer component, depending on the rate of the desired release.

In certain instances, to achieve certain beneficial effects of the present invention, the encapsulated oxidizer component particulates should have a specific gravity that will enable them to remain in a desired location within the well bore. For instance, in a gravel pack application, the encapsulated delayed-release oxidizer component particulates should have a specific gravity that will enable them to be dispersed within the gravel pack, preferably uniformly. For instance, the specific gravity of the encapsulated delayed-release oxidizer component particulates should be high enough that they do not return to the surface during the operation, and they do not clump when downhole. For example, in certain embodiments, the magnesium peroxide or the calcium peroxide oxidizer components may be encapsulated and may have a specific gravity of about the same specific gravity of the gravel particulates in the gravel pack composition, preferably at least about 2, and most preferably above 2.5.

In the practice of the present invention, depending upon the temperature of the formation to be treated and the desired break time of the viscosified treatment fluid, the encapsulated oxidizer component may be present in an amount of from about 0.1 to in excess of 50 pounds per 1,000 gallons of the fluid.

Suitable mutual solvents that may be used in the clean-up compositions of the present invention may include any suitable mutual solvent that will not negatively impact the composition. Particularly suitable such mutual solvents are comprised of glycol ethers and alkyoxylates of glycol ethers. A particularly preferred mutual solvent is comprised of ethylene glycol monobutyl ether mixed with alkyoxylated alcohol and is commercially available under the trade designation includes "MUSOL®-A SOLVENT," available from Halliburton Energy Services, Duncan, Okla. The mutual solvent is generally included in a clean-up composition of the present invention in an amount in the range of from about 0% to about 10% by volume of solution.

Suitable surfactants that may be used in the clean-up compositions of the present invention may include, but are not limited to, those that can act as wetting agents, surface tension reducers, nonemulsifiers, formation water wetters, and the like. The may include nonionic, anionic, cationic, amphoteric, and zwitterionic surfactants. Specific examples may include, but are not limited to, alkyl sulfonates, alkyl aryl sulfonates including alkyl benzyl sulfonates such as salts of dodecylbenzene sulfonic acid, alkyl trimethylammonium chloride, branched alkyl ethoxylated alcohols, phenol-formaldehyde nonionic resin blends, cocobetaines, dioctyl sodium sulfosuccinate, imidazolines, alpha olefin sulfonates, linear alkyl ethoxylated alcohols, trialkyl benzylammonium chloride and the like. When used, the surfactant is included in the concentrate in an amount in the range of from about 0% to about 10% by volume of the solution. Substantially any other surfactant that is known to be suitable for use in the treatment of subterranean formations and which does not adversely react with the fluid may be utilized.

In some embodiments, the clean-up compositions of the present invention can be used before or after a fracturing job to act as an enhancer for a chlorite-based breaker system as described above. In other embodiments, the clean-up compositions of the present invention may be used as a fluid stage pumped immediately after the proppant laden stage, at matrix rates, to infiltrate the propped fracture to break the gelled fluid contained within the fracture. The clean-up compositions also may be used to clean up viscosified treatment fluid residue, such as fracturing fluid residue, gel pill residue, or gravel pack fluid residue, that might otherwise negatively impact productivity.

In some embodiments, the clean-up compositions of the present invention can be used before a fracturing job to act as an enhancer for a chlorite-based breaker system as described above. In such cases, the viscosified treatment fluid utilized in the fracturing job may comprise a viscosifying or gelling agent (the terms may be used interchangeably) that may include natural and derivatized polysaccharides that are soluble, dispersible or swellable in an aqueous liquid to yield viscosity to the liquid. One group, for example, of polysaccharides which are suitable for use in the present invention includes arabic gum, ghatti gum, karaya gum, tamarind gum, tagacanth gum, guar gum, locust bean gum and the like. Modified gums such as carboxyalkyl derivatives, like carboxymethyl guar, and hydroxyalkyl derivatives, like hydroxypropyl guar can also be employed. Doubly derivatized gums such as carboxymethylhydroxypropyl guar (CMHPG) can also be used. Modified celluloses and derivatives thereof can also be employed in the practice of the present invention, for example, cellulose ethers, esters and the like. In general, any of the water-soluble cellulose ethers can be used. Those cellulose ethers include, among others, the various carboxyalkyl cellulose ethers, such as carboxyethyl cellulose and carboxymethyl cellulose (CMC); mixed ethers such as carboxyalkyl ethers, e.g., carboxymethyl hydroxyethyl cellulose (CMHEC); hydroxyalkyl celluloses such as hydroxyethyl cellulose (HEC) and hydroxypropyl cellulose; alkyhydroxyalkyl celluloses such as methylhydroxypropyl cellulose; alkyl celluloses such as methyl cellulose, ethyl cellulose and propyl cellulose; alkylcarboxyalkyl celluloses such as ethylcarboxymethyl cellulose; alkylalkyl celluloses such as methylethylcellulose; hydroxyalkylalkyl celluloses such as hydroxypropylmethyl cellulose; and the like. A preferred derivatized cellulose is a hydroxyethyl cellulose grafted with vinyl phosphonic acid such as disclosed in U.S. Pat. No. 5,067,565, issued to Holtmyer, et al. on Nov. 26, 1991, the entire disclosure of which is incorporated herein by reference. The most preferred polysaccharides are the galactomanans, modified or derivative galactomanans, and cellulose derivatives, examples of which are given above.

The chemistry and materials involved in the preparation of the viscosified treatment fluids of the type described above is well understood in the art. Typically, the amount of gelling or viscosifying agent employed in the aqueous gel depends upon the desired viscosity of the aqueous gel. The gelling agent generally is present in an amount of from about 10 to about 120 pounds per 1000 gallons of fluid. The preferred concentration is in the range of from about 15 to about 60 pounds per 1000 gallons of fluid.

The viscosified treatment fluid may include a cross-linking agent to further enhance the development of viscosity by cross-linking the gelling agent. The cross-linking agent can comprise a borate releasing compound or any of the well known transition metal ions which are capable of creating a cross-linked structure with the particular gelling agent utilized. Examples of such cross-linking agents include a borate releasing compound such as sodium tetraborate, aluminum, zirconium or titanium chelates, antimony compounds and the like. The cross-linking agent can be controlled to permit introduction of the aqueous gel into a well bore before the viscosity of the gel significantly increases.

The aqueous fluid utilized in the preparation of the viscosified treatment fluid may include a salt, such as potassium chloride, e.g., to minimize the swelling of clays and the chances of damage to the subterranean formation upon contact with the fluid. The aqueous fluid may include any of the other conventional additives such as proppants, pH control agents, bactericides, clay stabilizers, surfactants and the like which do not adversely react with the other constituents to inhibit performance of the desired treatment upon a subterranean formation.

While not wishing to be limited by any particular theory, it is believed that the clean-up composition of the present invention may catalyze the action of the chlorite-based breaker, thereby enhancing its effectiveness, especially at low temperatures, including those below 200° F., and more possibly, especially below 130° F. or so.

In some embodiments, the clean-up composition may be used after the fracturing job, e.g., to continue to reduce the viscosity of the fluid (or contribute to its reduction) and/or clean up gel residue in the formation that may exist as a result of the fracturing treatment or any previous treatment performed in the subterranean formation. In some embodiments, the clean-up composition may be used as a pre-pad fluid to the viscosified treatment fluid.

After a treatment has been performed in a subterranean formation through use of a viscosified fluid, it is possible that polymeric residue from the viscosifying agent used may be left in the formation. This polymeric residue can be problematic. The polymeric residue can result from a fracturing fluid, a gravel pack fluid, a frac-pack fluid (e.g., when fracturing and gravel packing operations are combined), a gelled pill (e.g., a fluid loss pill), and the like. The polymeric residue may be due to the gelling agent used in these fluids, including linear and crosslinked gelling agents (e.g., linear and crosslinked biopolymers and synthetic polymers). The polymeric residue also may be the result of a viscoelastic surfactant being used in a fluid to increase its viscosity. Thus, the composition of the polymeric residue may vary.

Despite the variation in the composition of residues, the clean-up compositions of the present invention can be used to at least reduce the amount present in the subterranean formation, and in some cases, substantially remove it. The clean-up compositions may be especially useful for residue that comprises a polymeric component. To clean up residue, a clean-up composition of the present invention may be added to a portion of the formation in which it is believed that residue is present. The amount of treatment fluid added would depend upon the amount of residue and must be sufficient to contact the majority of the residue. If used to clean up residue, the clean-up fluid could be pumped anytime after the treatment fluid is pumped, but if the activator needs to still be present from the treatment fluid, this would have to be a short time after the treatment fluid was pumped.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Moreover, the indefinite articles "a" or "an", as used in the claims, are defined herein to mean one or more than one of the element that it introduces. Also, the terms in the claims have their plain, ordinary meaning unless otherwise explicitly and clearly defined by the patentee.

What is claimed is:

1. A method of reducing the viscosity of a viscosified treatment fluid comprising:
   providing a clean-up composition comprising a carboxylic acid wherein the carboxylic acid comprises a carboxylic acid chosen from the group consisting of: isophthalic acid, terephthalic acid, pamoic acid, thapsic acid, valporic acid, and a mixture of two or more of these;
   providing a chlorite-based breaker system comprising an alkali metal compound and an activator; and,
      wherein the activator comprises a metal and an amine;
         the metal comprising iron, cobalt, or a combination thereof; and,
         the amine selected from the group consisting of tetraethylenepentamine, butyl amine, ethylene diamine, diethylene triamine, and ethylene diamine hydrogen chloride salt;
   providing a viscosified treatment fluid;
   placing the viscosified treatment fluid in a subterranean formation via a well bore penetrating the subterranean formation;
   contacting the viscosified treatment fluid with the clean-up composition;
   contacting the viscosified treatment fluid with the chlorite-based breaker system.

2. The method of claim 1 wherein the clean-up composition further comprises an oxidizer.

3. The method of claim 1 wherein the chlorite-breaker system is a component of the viscosified treatment fluid.

4. The method of claim 1 wherein the clean-up composition further comprises an additive chosen from the group consisting of: a gas, a chelator, a sequestering agent, an iron control agent, a breaker activator, a reducing sugar, a metal breaker activator, an anti-sludging agent, a corrosion inhibitor, a surfactant, a scale inhibitor, and a mixture of two or more of these.

5. The method of claim 1 wherein the chlorite-based breaker system further comprises a metal or a metalloid chosen from the group consisting of: a copper II ion, zinc, chromium, manganese, nickel, vanadium, boron, and a mixture thereof.

6. The method of claim 2 wherein the oxidizer comprises an oxidizer chosen from the group consisting of: persulfates, peroxides, perborates, oxyacids and oxyanions of halogens, and a mixture of two or more of these.

7. The method of claim 1 wherein the steps of contacting the viscosified treatment fluid with the clean-up composition and contacting the viscosified treatment fluid with the chlorite-based breaker occur at the same time.

8. The method of claim 7 wherein the chlorite-breaker system is a component of the viscosified treatment fluid.

9. The method of claim 1 wherein the step of contacting the viscosified treatment fluid with the clean-up composition occurs after the step of contacting the viscosified treatment fluid with the chlorite-based breaker.

10. The method of claim 1 wherein the clean-up composition comprising a carboxylic acid is placed in a subterranean formation as a pre-pad treatment before placing the viscosified treatment fluid in the same subterranean formation.

11. The method of claim 1 wherein the viscosified treatment fluid is a fracturing fluid.

12. A method of reducing polymeric residue from a subterranean formation comprising:
   placing a clean-up composition comprising a carboxylic acid and a chlorite-based breaker system in a subterranean formation in contact with an amount of polymeric residue;
   wherein the carboxylic acid comprises a carboxylic acid chosen from the group consisting of: isophthalic acid, terephthalic acid, pamoic acid, thapsic acid, valporic acid, and a mixture of two or more of these;
   where the chlorite-based breaker system comprises an alkali metal compound and an activator; and,
      wherein the activator comprises a metal and an amine;
         the metal comprising iron, cobalt, or a combination thereof; and,
         the amine selected from the group consisting of tetraethylenepentamine, butyl amine, ethylene diamine, diethylene triamine, and ethylene diamine hydrogen chloride salt; and,
   wherein the clean-up composition reduces the amount of polymeric residue present in the formation.

13. The method of claim 12 wherein the clean-up composition further comprises an oxidizer.

14. The method of claim 12 wherein the clean-up composition further comprises an additive chosen from the group consisting of: a gas, a chelator, a sequestering agent, an iron control agent, a breaker activator, a reducing sugar, a metal breaker activator, an anti-sludging agent, a corrosion inhibitor, a surfactant, a scale inhibitor, and a mixture of two or more of these.

15. The method of claim 12 wherein the chlorite-based breaker system further comprises a metal or a metalloid chosen from the group consisting of: manganese, nickel, vanadium, and a mixture thereof.

16. The method of claim 12 wherein the clean-up composition and the chlorite-based breaker system are placed in the subterranean formation at different times and optionally separated by a spacer fluid.

17. The method of claim 13 wherein the oxidizer comprises an oxidizer chosen from the group consisting of: persulfates, peroxides, perborates, oxyacids and oxyanions of halogens, and a mixture of two or more of these.

18. The method of claim 1 wherein the alkali metal compound is an alkali metal chlorite, an alkali metal hypochlorite, or a combination thereof.

19. The method of claim 12 wherein the alkali metal compound is an alkali metal chlorite, an alkali metal hypochlorite, or a combination thereof.

20. The method of claim 1 further comprising a carboxylic acid chosen from the group consisting of: lactic acid, butanoic acid, adipic acid, hydroxypropionic acid, pentanoic acid, hexanoic acid, heptanoic acid, octanoic acid, nonanoic acid, decanoic acid, dodecanoic acid, palmitic acid, stearic acid, sebacic acid, suberic acid, traumatic acid, and a mixture of two or more of these.

21. The method of claim 12 further comprising a carboxylic acid chosen from the group consisting of: lactic acid, butanoic acid, adipic acid, hydroxypropionic acid, pentanoic acid, hexanoic acid, heptanoic acid, octanoic acid, nonanoic acid, decanoic acid, dodecanoic acid, palmitic acid, stearic acid, sebacic acid, suberic acid, traumatic acid, and a mixture of two or more of these.

\* \* \* \* \*